Figure 1:
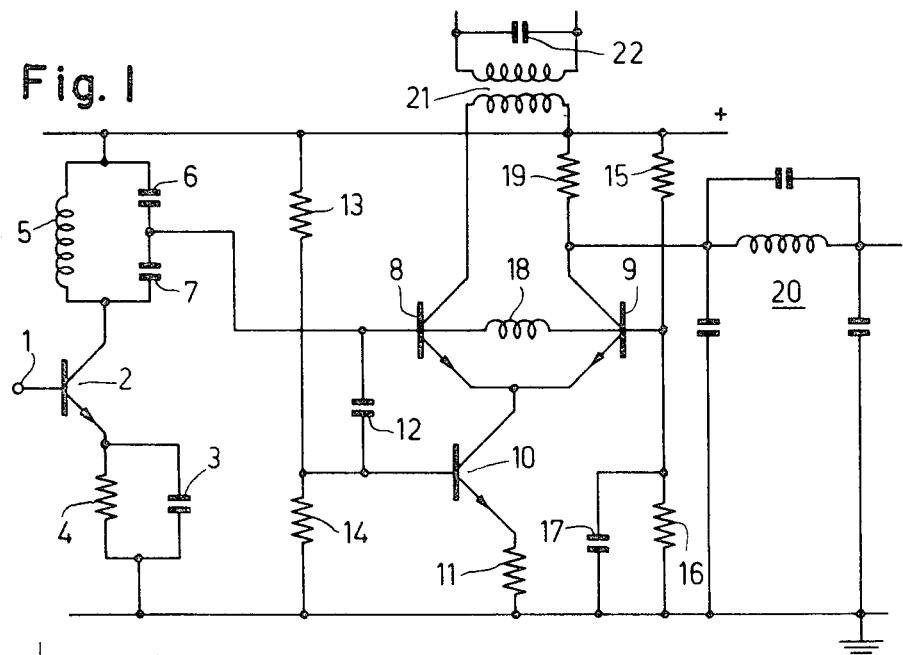
Figure 2:
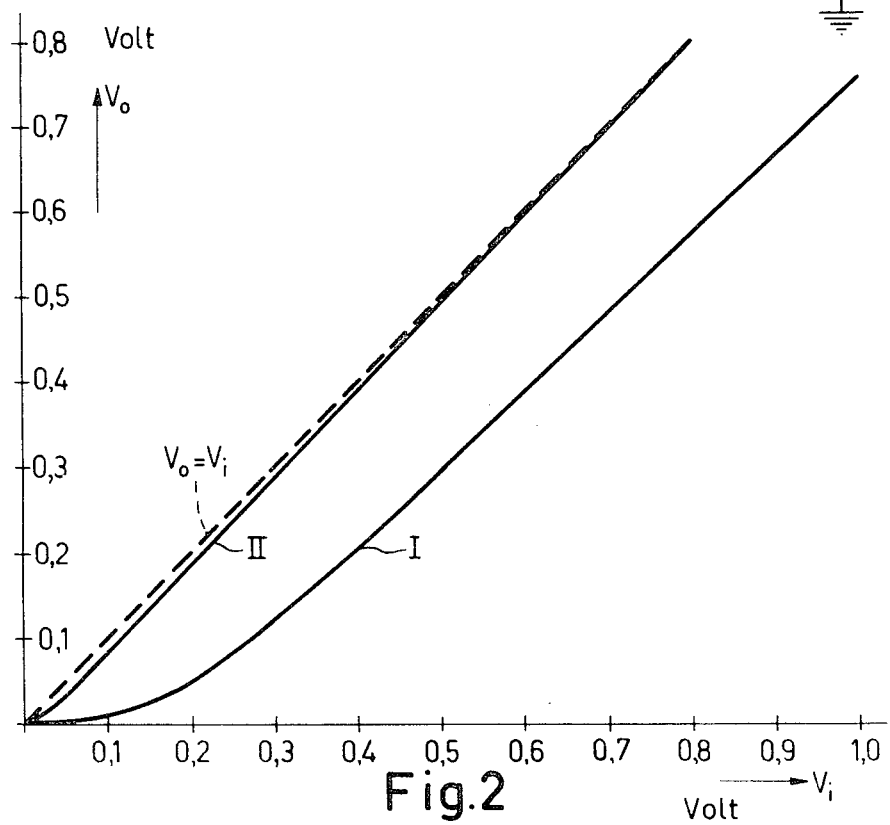

United States Patent
David et al.

[15] 3,646,457
[45] Feb. 29, 1972

[54] HIGH SPEED GREATEST OF COMPARATOR CIRCUIT

[72] Inventors: Charles E. David, Huntsville; Wallace E. Wood, Arab, both of Ala.

[73] Assignee: The United States of America as represented by the Secretary of the Army

[22] Filed: Oct. 6, 1965

[21] Appl. No.: 493,589

[52] U.S. Cl. ........................... 328/147, 328/148, 307/235
[51] Int. Cl. ......................................................... H03k 5/20
[58] Field of Search .......... 307/235; 328/104, 117, 145–147, 328/148

[56] References Cited

UNITED STATES PATENTS

| | | | |
|---|---|---|---|
| 2,529,666 | 11/1950 | Sands | 328/117 |
| 2,637,810 | 5/1953 | Moerman | 328/104 |
| 2,658,167 | 11/1953 | Harris | 328/148 |
| 2,815,448 | 12/1957 | Filipowsky | 328/147 |
| 2,820,896 | 1/1958 | Russell | 328/116 |
| 3,046,415 | 6/1962 | Winslow | 307/235 |
| 3,089,091 | 5/1963 | Lindenthal | 328/104 |
| 3,092,732 | 6/1963 | Milford | 307/235 |
| 3,228,002 | 1/1966 | Reines | 307/235 |
| 3,321,639 | 5/1967 | Fowler | 307/235 |
| 3,348,072 | 10/1967 | Marcus | 328/147 |

Primary Examiner—Donald D. Forrer
Assistant Examiner—Harold A. Dixon
Attorney—Harry M. Saragovitz, Edward J. Kelly, Herbert Berl and Robert C. Sims

[57] ABSTRACT

A device for analyzing groups of signals simultaneously, providing a digital signal to indicate which signal is the largest, and produce the amplitudes of the largest inputs in the other groups. The signals in a particular group are fed to a parallel combination of transistors. The largest signal in a group causes its transistor to conduct and thereby back-bias all other transistors. A plurality of groups are likewise connected so that the largest signal from any group is presented at a particular output. The largest signals from the other groups produce outputs which are fed to inhibit gates (AND gates) along with other outputs from the groups to control output transistors so that their output is the same as the second and third largest input signals.

5 Claims, 1 Drawing Figure

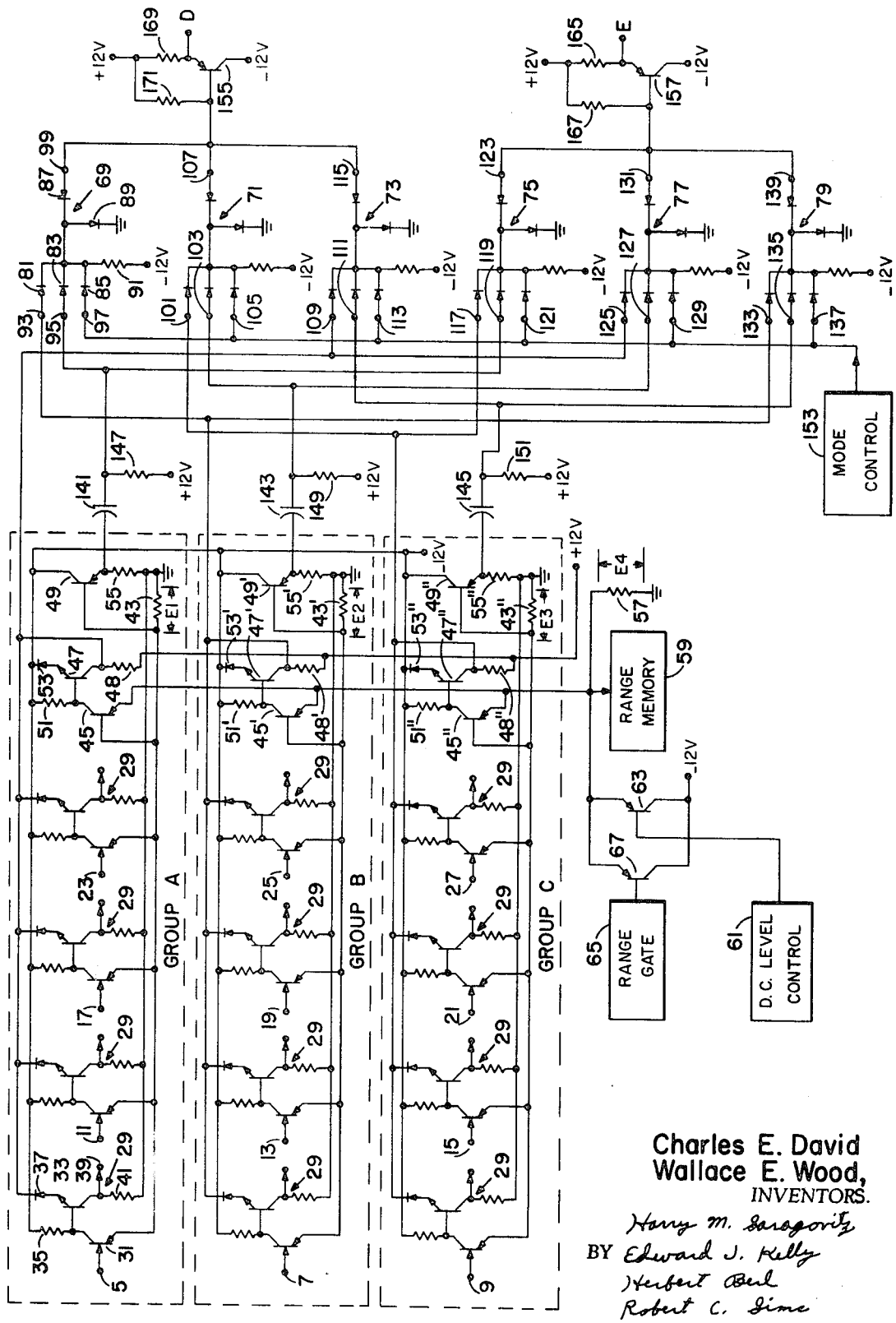

HIGH-SPEED GREATEST OF COMPARATOR CIRCUIT

The invention described herein may be manufactured and used by or for the Government for governmental purposes without the payment of any royalty thereon.

This invention relates generally to apparatus for analyzing numerous input signals simultaneously and more specifically to an electronic system which will produce a digital output indicating which input was the largest, produce the amplitude of the largest input at one output, produce the amplitudes of the second and third largest inputs at other outputs.

The need for a signal analyzer of this nature is frequently encountered in radar systems for use in the processing of radar returns.

One particular application of this invention is to process the signals out of a filter bank in a pulse doppler radar system. Its high speed and small size will greatly reduce the amount and size of the circuitry required in some of the advanced pulse doppler radars that are under development for future missile systems. Since most of its components are resistors, diodes and transistors, it could easily be converted to a thin film circuit.

It is, therefore, an object of this invention to provide a circuit which will analyze a plurality of input signals as to the one having the greatest amplitude.

It is another object of this invention to provide a circuit which will analyze a plurality of input signals to further produce the second and third largest input signal at separate outputs.

It is still another object of this invention to provide a "-greatest of comparator circuit" that can be substantially reduced in size.

It is further an object of this invention to provide a "greatest of comparator circuit" that greatly increases the speed at which signals can be analyzed.

These and other objects of the present invention will now become apparent from the following detailed specification when considered in connection with the accompanying drawing wherein the single FIGURE shows a schematic diagram illustrating a basic concept according to the present invention.

In order to better understand the operation of the circuit described in the FIGURE, a description of its components is first presented.

Referring now to the FIGURE there is shown the circuit according to the present invention. A plurality of input terminals, indicated by reference numerals 5 thru 27 are provided for connection thereto of signals to be analyzed in regard to their amplitude. These inputs are grouped into three groups (A, B, and C) as shown in the FIGURE surrounded by dashed lines. Each input terminal is connected to an amplitude-sensitive switching circuit generally indicated by reference numeral 29.

Each of the switching circuits 29 are identical and the structure and connections will be exemplified particularly with the circuit as shown connected to input terminal 5 of group A. Input terminal 5 is connected to the base electrode input transistor 31. The collector electrode of PNP-transistor 31 is connected to a −12-volt supply through resistor 35. The base electrode of an NPN-transistor 33 is also connected to the collector electrode of transistor 31. The emitter electrode of transistor 33 is connected to the anode of a diode 37. The collector electrode of transistor 33 is connected to ground potential through a resistor 41. An output terminal 39 is connected to the collector electrode of transistor 33 for providing a digital output.

Each of the groups A, B, and C contain four circuits 29 as discussed above. In each group the emitter electrodes of transistors 31 are connected in common and the cathodes of diodes 37 are connected in common.

In group A, the common emitter connection is connected to ground potential through a resistor 43. The ungrounded side of resistor 43 is connected to the base electrode of both PNP-transistors 45 and PNP-transistor 49. The common diode connection is connected to the collector electrode of a transistor 47. The base electrode of transistor 47 is connected to the collector electrode of transistor 45 and to the −12-volt supply through a resistor 51. The emitter electrode of transistor 47 is connected to the −12-volt supply through a diode 53. The collector electrode of transistor 47 is connected to a positive 12-volt supply through resistor 48. The collector electrode of transistor 49 is connected to the −12-volt supply and the emitter electrode of transistor 49 is connected to ground potential through resistor 55.

In groups B and C the common emitter connection is connected to ground potential through resistors 43' and 43" respectively. The ungrounded side of resistors 43' and 43" are respectively connected to the base electrodes of both transistors (45' and 49') and (45" and 49") which are connected in the same circuit arrangement as discussed above for group A. The similar parts being identified by a prime in group B and a couple prime in group C.

The emitter electrodes of transistors 45, 45' and 45" are connected to ground potential through a common resistor 57. The ungrounded side of resistor 57 is further connected to a range memory circuit 59 which accepts the input signal which is the greatest in amplitude.

A DC level control 61 is connected to the base electrode of a PNP-transistor 63. The collector electrode of transistor 63 is connected to the −12-volt supply and the emitter electrode is connected to the input of the range memory 59.

A range gate circuit 65 is connected to the base electrode of a PNP-transistor 67 whose collector is connected to the −12-volt supply and the emitter connected to the input of the range memory 59.

To aid in presenting the second and third greatest input signal at terminals D and E six inhibitor circuits generally indicated by reference numerals 69 thru 79 are provided. Each of the circuits are identical and connections will be discussed with reference to inhibitor 69. There is shown diodes 81, 83, and 85 having their anodes connected respectively to input terminals 93, 95, and 97. The cathodes of diodes 81, 83, and 85 are connected to the −12-volt supply through a common resistor 91. The cathodes are also connected to ground potential through a diode 89 and further they are connected to an output terminal 99 through a diode 87.

Connections are made to the input terminals of the inhibitor circuits 69 and 79 as follows:

The emitter electrode of transistor 49 is connected to input terminals 95 and 119 through capacitor 141. The emitter electrode of transistor 49' is connected to input terminals 103 and 127 through capacitor 143. The emitter electrode of transistor 49" is connected to input terminals 111 and 135 through capacitor 145. The +12-volt supply is connected to the connection between capacitors 141, 143 and 145 and their respective input terminals through resistors 147, 149 and 151 respectively. The collector electrode of transistor 47 is connected to input terminals 109 and 125. The collector electrode of transistor 47' is connected to input terminals 93 and 133. The collector electrode of transistor 47" is connected to input terminals 101 and 117. Input terminals 97, 105, 113, 121, 129 and 137 are connected to the output of mode control circuit 153.

The output terminals 99, 107 and 115 of inhibitor circuits 69, 71 and 73 are connected in common to the base electrode of the D output transistor and output terminals 123, 131 and 139 of inhibitor circuits 75, 77 and 79 are connected in common to the base electrode of the E output transistor. The collector electrodes of both transistors 155 and 157 are connected to the −12-volt supply.

The positive 12-volt supply is connected to the emitter electrode and the base electrode of transistor 157 through resistor 165 and 167 respectively and to the emitter electrode and base electrode of transistor 155 through resistor 169 and 171 respectively. The output terminal D is connected to the emitter electrode of transistor 155 and the output terminal E is connected to the emitter electrode of transistor 157.

OPERATION

In operation, with the particular example of the present invention being used to analyze the signals out of a filter bank in a pulse doppler radar system, video signals are simultaneously applied to the inputs 5 thru 27. The largest input signal in group A (which consists of inputs 5, 11, 17, and 23) will produce a voltage drop E1 across resistor 43. Since this voltage is derived from the largest signal in group A, it will cause the remainder of the group A input transistors to be back biased. The transistor 31 with the largest input signal will conduct thereby applying a signal to the following transistor 33. Simultaneously the voltage drop E1 is applied to the inputs of transistors 45 and 49.

Group B (which consists of inputs 7, 13, 19 and 25) will simultaneously produce a voltage E2 across resistor 43' and apply it to the inputs of transistors 45' and 49'.

Group C (which consists of inputs 9, 15, 21 and 27) will also simultaneously produce a voltage E3 across resistor 43" and apply it to the inputs of transistors 45" and 49". Assuming that the largest signal of group A was also larger than any of the signals applied to group B and C, it will then produce a voltage drop E4 across resistor 57 due to transistor 45 being turned "on." The voltage drop E4 is simultaneously applied to the output (to range memory) and to transistor 47. E4 is also the amplitude of the largest signal. In this example the amplitude of the input signal applied to input terminal 5.

Note that transistors 47 and 33 are simultaneously being turned on. This permits current to flow in transistors 47 and 33. Therefore a digital signal is produced at the output terminal 39. This digital signal indicates that input terminal 5 has the largest input signal. In addition the collector of transistor 47 is clamped to −12 volts which is applied to terminals 109 and 125 of inhibitors 73 and 77 respectively. This −12 volts back-biases diodes 81 of inhibitors 73 and 77.

Assuming inputs in groups B and C transistors 31 having the larger input in each group will be conducting. Assuming the input to group A to be larger than any inputs to group B or group C, transistors 45' and 45" will not conduct because they are back-biased by E4. The largest signal applied to group B and C will appear at the output of transistor 49' and 49", respectively.

The signal at the output of transistor 49' is AC coupled to input terminals 103 and 127 of inhibitor circuits 71 and 77 respectively. The signal at the output of transistor 49" is AC coupled to input terminals 111 and 135 of inhibitor circuits 73 and 79 respectively. The mode control 153 output is −12 volts when in this mode. Diodes 85 are back-biased. If no outputs at D and E are desired the mode control output is switched to a +12 volts which causes diodes 85 to conduct.

The diodes 81 of both inhibitor circuits 73 and 77 are back-biased by 12 volts applied thru transistor 47. Diodes 85 of both inhibitor gates 73 and 77 are back-biased by −12-volts from the mode control line. The signal at the output of transistor 49' will pass through diodes 83 and 87 of inhibitor 77 and on to the base of transistor 157. Therefore the largest signal in group B will appear at the E output terminal. The signal at the output of transistor 49" will simultaneously pass through diodes 83 and 87 of inhibitor 73 and on to the base of transistor 155. Therefore the largest signal in group C will simultaneously appear at the D output terminal.

Since transistor 47' and 47" did not conduct, diodes 81 of inhibitors 69, 71, 75, and 79 were conducting thereby inhibiting any signals applied to terminals 95, 103, 119, and 135. This sequence has shown that the largest input signal appears at the output of range memory circuit 59 and that the largest signals in the other groups will appear at D and E outputs.

If a threshold on the input signals is desired, (wherein any input signal below a given amplitude would be rejected by the circuit) a DC level which is equal to the desired threshold may be applied by the DC level control 61.

Inhibit gates 69, 71, 73, 75, 77, and 79 comprise diodes 81, 83, 85, and 89. If diode 81, 83, or 85 is forward-biased, that inhibit gate is said to be inhibited. It cannot, therefore, cause output transistor 155 or 157 to be turned on. In the particular example given, the largest input was in Group A. This permits transistor 45, 57, and 49 to conduct. A negative voltage through transistor 49 is applied at inputs 95 and 119 to inhibit gates 69 and 75, respectively. A −12-volts thru transistor 47 is applied at inputs 109 and 125 to inhibit gates 73 and 77, respectively. With transistor 47' not conducting, a positive voltage thru resistor 48' is applied to inputs 93 and 133 of inhibit gates 69 and 79 respectively. With transistor 47" not conducting, a positive voltage thru resistor 48" is applied to inputs 101 and 117 of inhibit gates 71 and 75, respectively. The negative output from transistor 49' is applied to inputs 103 and 127 of inhibit gates 71 and 77, respectively. The negative output from transistor 49" is applied to inputs 111 and 135 of inhibit gates 73 and 79, respectively. −12 volts from mode control 153 is applied to diode 85 of each inhibit gates. The only gates not inhibited are 73 and 77. Gates 73 and 77 respond to the output from transistors 49" and 49' respectively. The voltage at points 99, 107, 123, and 139 will be approximately +1 volt assuming a ½-volt drop for each diode 87 and 89. The output from transistors 49, 49', and 49" will be between 0 and −12 volts. For the purpose of this discussion, it may be assumed that the output from transistor 49' is −5 volts. The −5 volts will be applied to input 127 of gate 77. This will cause diode 83 of that gate to conduct. As diode 83 conducts, the voltage at its cathode will rise toward −5 volts from −12 volts and cause diode 83 to cut off. Assuming ½-volt drop for diode 83 and 87 of gate 77, the voltage at 131 will be −5 volts. This −5 volts will cause transistor 157 to be turned on. The output of transistor 157 will be indicative of the largest signal from group B. The same action takes place at gate 73 for the signal from group C.

Further, it may be assumed that the largest signal in group B is larger than any signal from group C or A. With this assumption, inhibit gates 71, 73, 75, and 77 will be inhibited. Gate 69 will respond to the output from transistor 49, group A. Gate 79 will respond to the output from transistor 49", group C. The operation of diodes 81, 83, and 85 and transistors 155 and 157 is the same as explained in the previous example.

If only a sample of the input signals are desired, a −12 volts can be applied by range gate 65.

The diodes 37 of circuits 29 are only required to protect their respective transistors. NPN transistors that are suitable for this application do not have large enough emitter to base breakdown voltages.

By using the sequence described above it can be shown that the circuit will determine which input signal was the largest and the amplitude of the largest signal in each of the other groups. When the inputs are derived from a filter bank, this circuit will determine which filter the signal is in and present the amplitude of the lower adjacent filter at the D output and the amplitude of the higher adjacent filter at the E output. This data can then be used for interpolation of the Doppler measurement quantum when the circuit is used as explained in the example above.

While in accordance with the provisions of the statutes we have illustrated and described the best form of the invention known to us, it will be apparent to those skilled in the art that changes may be made in the form of the apparatus disclosed without departing from the spirit of the invention as set forth in the appended claims, and that in some cases certain features of the invention may be used to advantage without a corresponding use of other features. Accordingly, we desire the scope of our invention to be limited only by the appended claims.

We claim:

1. An amplitude-sensitive circuit for selecting from a plurality of signals applied simultaneously the signal having the greatest amplitude comprising: a plurality of input terminal means for receiving input signals of various amplitudes; a plurality of first amplitude-sensitive selection means each having an input and and output means, with said output means connected in common; said input means being connected to respective ones of said input terminal means; a second amplitude-sensitive selection means having an input and an output means; said input means of said second amplitude-sensitive selection means being connected in common to said output means of said first amplitude-sensitive selection means; said output means of said second amplitude-sensitive selection means being connected to a first output terminal for providing the selected signal of greatest amplitude to a utilization device; and a plurality of digital switching means having an input and an output; each of said first amplitude-sensitive selection means having a second output means connected to respective ones of said input of said digital switching means; and said output of said digital switching means providing a digital signal indicating which one of said plurality of input signals was the greatest in amplitude.

2. An amplitude sensitive circuit for selecting from a plurality of signals applied simultaneously the signal having the greatest amplitude comprising: a plurality of input terminal means for receiving input signals of various amplitudes; a plurality of first amplitude-sensitive selection means each having an input and an output; each of said first amplitude-sensitive selection means having its input connected to respective ones of said plurality of input terminal means; said plurality of input terminal means being divided into a plurality of groups; each of said groups having a second amplitude-sensitive selection means each having an input and an output; said outputs of each of said first amplitude-sensitive selection means of each of said groups being connected in common to said input of said second amplitude-sensitive selection means; said outputs of each of said second amplitude-sensitive selection means being connected in common to a first output terminal means for providing the selected signal of greatest amplitude to a utilization device; a plurality of first digital switching means having an input and an output; said input of said first digital switching means being connected to a second output of respective ones of said first amplitude-sensitive selection means; and said output of each of said plurality of first digital switching means being connected to an output terminal means for providing a digital indication of the greatest input signal within each of said plurality of group.

3. An amplitude-sensitive circuit as in claim 2 further comprising: a plurality of amplifier means each having an input and an output; each of said amplifier means being the same in number as said plurality of groups; said input of each of said amplifier means being connected respectively to each of said common connections of said outputs of said first amplitude-sensitive selection means; and said outputs of each of said amplifier means being connected to an output terminal means for providing the signal having the greatest amplitude in each of said plurality groups.

4. An amplitude-sensitive circuit for selecting from a plurality of signals applied simultaneously the signal having the greatest amplitudes comprising: a plurality of input terminal means for receiving input signals of various amplitudes; a plurality of amplitude-sensitive transistor signal selection means each having a base, emitter, and collector electrodes; each of said base electrodes being connected to respective ones of said plurality of input terminal means; said plurality of input terminal means being divided into a plurality of groups; each group having each of said collector electrodes of said transistor signal selector means connected through current limiting means to a voltage supply; each group having each of said emitter electrodes connected in common through a resistor to ground potential; each of said plurality of groups having an output transistor switching means each having a base, emitter and collector electrodes; said base electrode of each of said output transistor switching means being connected to said resistor at the common emitter connection end; each of said collector electrodes of said output transistor switching means being connected to said supply voltage through a current limitation means; and each of said emitter electrodes of said output transistor switching means being connected in common to a first output terminal whereby the signal of greatest amplitude of all the plurality of groups selected by said signal selection means along with said plurality of groups selected by said signal selection means along with said output transistor switching means is provided for a utilization device; a plurality of first transistor digital switching means having a base, emitter and collector electrodes; said base electrodes of each of said first transistor digital switching means connected respectively to each of said collector electrodes of said transistor signal selection means; said emitter electrodes of each of said first digital switching means connected to ground potential through resistors; and an output terminal connected to said collector electrode of each of said first digital switching means for providing a digital signal indicating the input having the greatest amplitude in each of said plurality of groups.

5. An amplitude-sensitive circuit as in claim 4 further comprising: a plurality of transistor amplifier means each having base, emitter and collector electrodes; said base electrode of each of said amplifier means being connected respectively to each of said common emitter connections of each of said plurality of groups of transistor signal selection means; said collector electrode of each of said amplifier means being connected to said supply voltage; said emitter electrodes of each of said amplifier means being connected to ground potential through resistors; and an output terminal connected to said collector electrode of each of said amplifier means for providing the selected signal of greatest amplitude of each of said plurality of groups.

* * * * *